US 11,938,621 B2

(12) United States Patent
Wang et al.

(10) Patent No.: US 11,938,621 B2
(45) Date of Patent: Mar. 26, 2024

(54) ROBOT DUAL-JOINT UNIT, AND LEGGED ROBOT AND COOPERATIVE MANIPULATOR USING THE SAME

(71) Applicant: HangZhou YuShu TECHNOLOGY CO., LTD., Zhejiang (CN)

(72) Inventors: Xingxing Wang, Zhejiang (CN); Zhiyu Yang, Zhejiang (CN)

(73) Assignee: HANGZHOU YUSHU TECHNOLOGY CO., LTD., Zhejiang (CN)

( * ) Notice: Subject to any disclaimer, the term of this patent is extended or adjusted under 35 U.S.C. 154(b) by 425 days.

(21) Appl. No.: 17/286,239

(22) PCT Filed: Sep. 17, 2019

(86) PCT No.: PCT/CN2019/106110
§ 371 (c)(1),
(2) Date: Apr. 16, 2021

(87) PCT Pub. No.: WO2020/078158
PCT Pub. Date: Apr. 23, 2020

(65) Prior Publication Data
US 2021/0339406 A1    Nov. 4, 2021

(30) Foreign Application Priority Data
Oct. 19, 2018  (CN) .......................... 201811222243.4

(51) Int. Cl.
*B25J 17/02*  (2006.01)
*B25J 9/10*  (2006.01)
*B25J 19/00*  (2006.01)

(52) U.S. Cl.
CPC ............. *B25J 17/025* (2013.01); *B25J 9/102* (2013.01); *B25J 19/0054* (2013.01)

(58) Field of Classification Search
CPC ....... B25J 17/025; B25J 9/102; B25J 19/0054
(Continued)

(56) References Cited

U.S. PATENT DOCUMENTS 4,645,409 A * 2/1987 Gorman ............... B25J 17/0283
901/29
5,860,331 A * 1/1999 Hashimoto ........... F16H 49/001
901/21
(Continued)

FOREIGN PATENT DOCUMENTS

CN    205327218 U    6/2016
CN    106476928 A    3/2017
(Continued)

*Primary Examiner* — T. Scott Fix
(74) *Attorney, Agent, or Firm* — Muncy, Geissler, Olds & Lowe, P.C.

(57) ABSTRACT

The present application relates to the technical field of robot joints, and discloses a robot dual-joint unit, and a legged robot and a cooperative manipulator using the same. The robot dual-joint unit includes a first joint consisting of a first motor and reducer assembly, a second joint consisting of a second motor assembly and a second reducer; a first output connecting rod is fixedly provided on an output shaft of the first motor and reducer assembly, the second reducer is provided in the first output connecting rod, and the second motor assembly drives the second reducer through a transmission rod. In the present application, a fixed end of the second motor assembly is fixed with a fixed end of the first motor and reducer assembly, rather than a fixed end of a second motor of a conventional robot joint series structure is fixed on an output end of a first motor and reducer assembly, such that the output inertia of two output shafts of the robot dual-joint is smaller, and a power cable leading to the second motor assembly of the second joint is omitted.

8 Claims, 5 Drawing Sheets

(58) Field of Classification Search
USPC .......................................................... 74/490.05
See application file for complete search history.

(56) References Cited

U.S. PATENT DOCUMENTS

| | | | | |
|---|---|---|---|---|
| 6,062,099 A | * | 5/2000 | Suwa ....................... | B25J 9/107 901/23 |
| 2010/0180708 A1 | * | 7/2010 | Kos .......................... | B25J 9/102 74/490.03 |
| 2013/0192406 A1 | * | 8/2013 | Godowski ................ | B25J 9/106 901/1 |

FOREIGN PATENT DOCUMENTS

| | | | |
|---|---|---|---|
| CN | 106904226 | A | 6/2017 |
| CN | 108189073 | A | 6/2018 |
| CN | 207683655 | U | 8/2018 |
| CN | 108556951 | A | 9/2018 |
| CN | 109176595 | A | 1/2019 |
| CN | 209408531 | U | 9/2019 |
| JP | 2001113488 | A | 4/2001 |

* cited by examiner

ROBOT DUAL-JOINT UNIT, AND LEGGED ROBOT AND COOPERATIVE MANIPULATOR USING THE SAME

TECHNICAL FIELD

The present application relates to the technical field of robot joints, in particular to a highly integrated robot dual-joint unit structure.

BACKGROUND

At present, both the manipulator used in industrial application and the high-performance legged robot have higher requirements on joint power units. We all hope that the joint unit has high integration, strong power, compact structure and small output rotational inertia. At present, the existing robot joint is a joint power unit integrating a single motor and a reducer, and then a combined structure of multiple joint power units sequentially connected in series one by one is adopted in the practical application of the legged robot or manipulator.

However, the existing joint power unit structure with two power units connected in series one by one has the following disadvantages:
1. The first power unit needs to drive the second power unit fixed at the end of the output shaft to move, in order to realize outputting a torque to the outside. The second power unit is a load of the first power unit, so the existing joint power unit structure increases additional rotational inertia, load and power consumption when the first power unit works, which seriously limits the movement performance of the robot.
2. In the application scenario of legged robots, such as the Chinese patent application No. 201720232286.5 disclosed on Mar. 10, 2017, it has disclosed a leg power system structure of an electric drive four-legged robot. When a thigh joint and a knee joint are constructed, a joint power unit structure is formed by connecting two power joint units respectively corresponding to a thigh and a shank, the power unit of the thigh and the power unit of the shank are generally provided on the two sides of a thigh structure. In this way, when the robot is moving, a part of the leg structure will protrude towards the outer side of the body, so the protruding part easily interferes with the external environment; and the protruding part is easily damaged due to the impact with the ground when the robot falls.
3. In the application scenario of the legged robot, such as the Chinese patent application No. 201720232286.5 disclosed on Mar. 10, 2017, it has disclosed a leg power system structure of an electric drive four-legged robot. When a thigh joint and a knee joint are constructed, a joint power unit structure is formed by connecting two power joint units respectively corresponding to a thigh and a shank, the second motor of the second joint and the first joint are always in a moving state when the first joint rotates, and thus the wiring to the second motor is very difficult and unreliable. In the prior art, the use of a conductive slip ring can solve the above problem, but the conductive slip ring will increase the structural complexity of the robot; if a cable is directly connected, the anti-fatigue strength of the cable is very demanding.

SUMMARY

In order to overcome the shortcomings of the prior art, the first purpose of the present application is to provide a highly integrated robot dual-joint unit. A fixed end of a second motor assembly is fixed with a fixed end of a first motor and reducer assembly, rather than a fixed end of a second motor of a conventional robot joint series structure is fixed on an output end of a first motor and reducer assembly, such that the output inertia of the two output shafts of the robot dual-joint is small, and the power cable leading to the second motor assembly of the second joint is omitted.

The second purpose of the present application is to provide a legged robot, which includes the highly integrated robot dual-joint unit. The second motor is disposed on the inner side of the thigh instead of the outer side of the thigh and is fixed with the first motor and reducer assembly, such that the legged robot has good anti-collision performance, the joint is not easily damaged, the wiring is facilitated, the requirement on the quality of the cable is low, and the leg structure of the robot is more compact and reasonable.

The third purpose of the present application is to provide a cooperative manipulator, which includes the highly integrated robot dual-joint unit.

The first purpose of the present application is realized by adopting the following technical solution:
A highly integrated robot dual-joint unit includes a first joint consisting of a first motor and reducer assembly, and a second joint consisting of a second motor assembly and a second reducer; a fixed end of the second motor assembly is fixedly connected with a fixed end of the first motor and reducer assembly, and an output end of the second motor assembly passes through the first motor and reducer assembly and drives the second reducer.

Further, the fixed ends of the first motor and reducer assembly and the second motor assembly are connected by screwing, welding, riveting, tenoning or pinning, and are preferably connected by screwing, so as to facilitate disassembly for maintenance and replacement of parts.

Further, a through hole for the transmission rod is provided in a rotation center of the first motor and reducer assembly, a first output connecting rod is fixedly provided on an output shaft of the first motor and reducer assembly, the second reducer is provided in the first output connecting rod, and the second motor assembly drives the second reducer through a transmission rod.

Further, the first motor and reducer assembly includes a first motor base, a first motor stator, a first motor rotor, a first reducer and a first motor front end cover; the second motor assembly includes a second motor base, a second motor rear end cover, a second motor stator, a second motor rotor and a transmission rod; the first motor stator is fixedly connected with the first motor base, the first motor rotor is rotationally connected with the first motor base, and the first reducer is disposed in a cavity formed after the first motor base is fixedly connected with the first motor front end cover; the second motor stator is fixedly connected with the second motor base, the second motor rotor is rotationally connected with the second motor base, and the second motor rear end cover is fixedly connected with the second motor base; the transmission rod is connected with the second motor rotor as an output shaft of the second motor assembly, and the transmission rod is connected with an input gear of the second reducer; The end of the transmission rod close to the second reducer is rotationally connected with the first output connecting rod or the second reducer by using a bearing, so as to prevent the instability of the transmission rod caused by the excessive length of the transmission rod. The second motor base is fixedly connected with the first motor and reducer assembly. The solution of the present application is detailed, the structure is simple and the production is facilitated.

Further, a first encoder is mounted between the first motor rotor and the first motor base, and a second encoder is mounted between the second motor rotor and the second motor base, thus realizing the independent control of the first motor rotor and the second motor rotor, and then realizing the bidirectional output of the dual-joint unit.

Further, a first output connecting rod is fixedly provided on an output shaft of the first motor and reducer assembly; the first output connecting rod includes a first housing and a second housing, and the output shaft of the first motor and reducer assembly is fixedly connected with one side of the first housing (31); the first housing and the second housing are fixedly connected to form an accommodating cavity, and the second reducer is provided in the accommodating cavity; the transmission rod passes through a rotation center of the first motor and reducer assembly and extends into the accommodating cavity to become an input shaft of the second reducer, such that the structure of the present application is compact, the solution is reasonable and the production is facilitated.

Further, an output end of the second reducer is provided with a second joint output rocker arm, a connecting rod is provided in the accommodating cavity, one end of the connecting rod is rotationally connected with the second joint output rocker arm, and the other end is rotationally connected with a second output connecting rod; the second joint output rocker arm, the connecting rod, the first output connecting rod and the second output connecting rod jointly form a connecting rod transmission, thus realizing the relatively independent movement of the first output connecting rod and the second output connecting rod to form a dual-joint structure, such that the structure is compact and the solution is reasonable.

Further, the robot dual-joint unit further includes a first motor driver and a second motor driver, the first motor driver is provided on a side part of the first motor base, and the second motor driver is provided on a side part of the second motor base; cooling fan is provided on the first motor base and the second motor base. The first motor and reducer assembly and the second motor assembly in the present application are integrated together, and only one cooling fan is needed to collectively dissipate the heat produced by the heat source, so it is not necessary to design too many cooling fans, thus reducing the weight of the leg structure.

The second purpose of the present application is realized by adopting the following technical solution:
A legged robot is provided, the legged robot includes the robot dual-joint unit described above and a body, and the first motor and reducer assembly is rotationally connected with the body.

The third purpose of the present application is realized by adopting the following technical solution:
A cooperative manipulator is provided, the cooperative manipulator includes the robot dual-joint unit described above and a base, and the first motor and reducer assembly is rotationally connected with the base.

Compared with the prior art, the present application has the following beneficial effects:
1. The first joint and the second joint in the present application are connected together, and the fixed end of the second motor assembly is fixed with the housing of the first joint, rather than the fixed end of the second motor assembly of the conventional robot joint series structure is fixed on the output end of the first motor and reducer assembly. Compared with the technical solution of the prior art, the present application enables the output inertia of the two output shafts of the robot dual-joint to be small, reduces the work of the first motor, decreases the energy consumption, and enables the structure to be more compact; at the same time, the power cable to the second motor assembly of the second joint is omitted, the wiring difficulty of the second motor assembly and the requirement on the quality of the cable are reduced, and the structure is simplified. The first joint and the second joint in the present application are sheathed together, the concept is ingenious, the prejudice of the prior art is broken, the structure is simple and practical, and the solution is feasible.

2. In the highly integrated robot dual-joint unit provided by the present application, the first motor and reducer assembly and the second motor assembly are provided on the inner side of the first output connecting rod, such arrangement of the first motor and reducer assembly and the second motor assembly makes the outer side of the first output connecting rod have no very protruding part relative to the body, it will not interfere with the external environment during the operation of the robot, and this part will not be damaged due to the impact with the ground when the robot falls.

3. Since the highly integrated robot dual-joint unit provided by the present application integrates the first motor and reducer assembly and the second motor assembly together, when the heat dissipation structure of the motor is designed, the intensive dissipation of the heat produced by the heat source is facilitated, there is no need to design too many cooling fans, and thus the weight of the leg structure is reduced.

4. In the highly integrated robot dual-joint unit provided by the present application, the weight of the first output connecting rod is reduced and thus its power performance is better when the first output connecting rod rotates.

5. In the highly integrated robot dual-joint unit provided by the present application, the motor wiring is mostly in the body and will not be exposed too much outside the body, and thus it can play a better role in protecting the wires.

6. In the legged robot provided by the present application, the first motor and reducer assembly and the second motor assembly on the leg are provided on the inner side of the first output connecting rod, thus the outer side of the first output connecting rod has no very protruding part relative to the body, it will not interfere with the external environment during the operation of the robot, and this part will not be damaged due to the impact with the ground when the robot falls. At the same time, the power cable leading to the second motor assembly of the second joint is omitted, the wiring difficulty of the second motor assembly and the requirement on the quality of the cable are reduced, and the structure is simplified. The first joint and the second joint of the present application are sheathed together, the concept is ingenious, the prejudice of the prior art is broken, the structure is compact and practical, and the solution is feasible.

7. In the cooperative manipulator provided by the present application, the first motor and reducer assembly and the second motor assembly are provided on the inner side of the first output connecting rod, thus the outer side of the first output connecting rod has no very protruding part relative to the base, and it will not interfere with the external environment during the operation of the robot.

The present application will be further described below in detail in combination with the embodiments with reference to the drawings.

Figure 1:
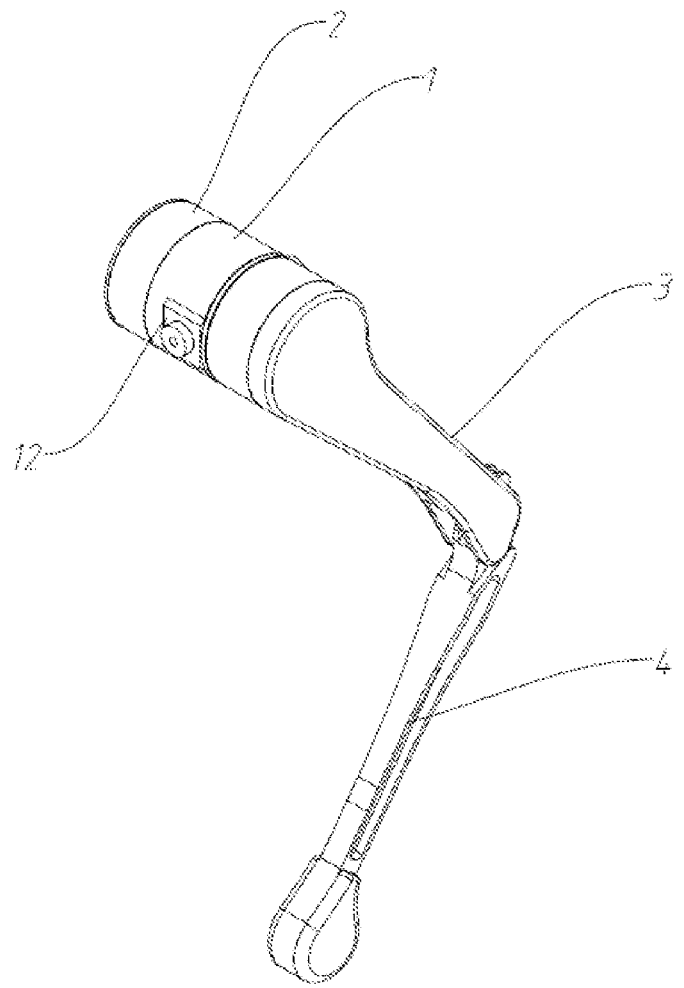
FIG. 1 illustrates a schematic view of an overall structure of the present application.

In the drawings: 100—body; 200—base; 1—first motor and reducer assembly; 2—second motor assembly; 3—first output connecting rod; 31—first housing; 32—second housing; 4—second output connecting rod; 41—first rotation center; 42—second rotation center; 5—first reducer; 6—second reducer; 7—first motor rotor; 8—second motor rotor; 9—transmission rod; 10—second joint output rocker arm; 11—connecting rod; 12—rotating seat; 13—second motor rear end cover; 14—first motor base; 15—second motor base; 16—first motor front end cover.

DETAILED DESCRIPTION

The present application will be further described below in combination with the specific embodiments with reference to the drawings. It should be noted that, on the premise of no conflict, the embodiments or technical features described below may be freely combined to form a new embodiment.

Figure 2:
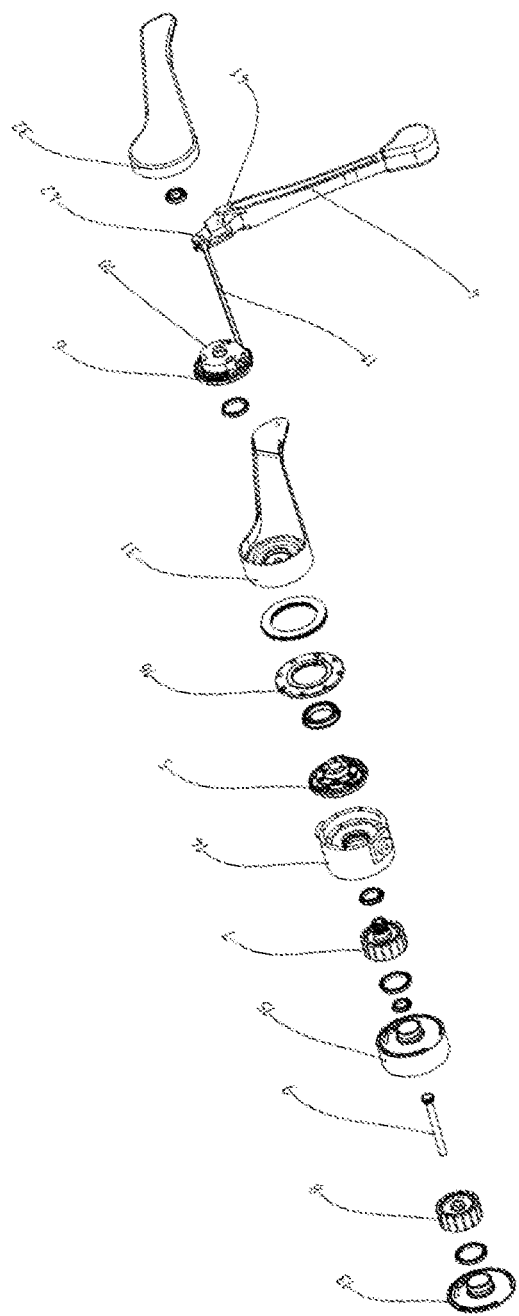
FIG. 2 illustrates an exploded view of the present application.

Referring to FIG. 1 and FIG. 2, the highly integrated robot dual-joint unit includes a first joint consisting of a first motor and reducer assembly 1, and a second joint consisting of a second motor assembly 2 and a second reducer 6; a first output connecting rod 3 is fixed on an output shaft of the first motor and reducer assembly 1, the second reducer 6 is provided in the first output connecting rod 3, and the second motor assembly 2 drives the second reducer 6 through a transmission rod 9.

The first motor and reducer assembly 1 includes a first motor base 14, a first motor stator, a first motor rotor 7, a first reducer 5 and a first motor front end cover 16; the second motor assembly 2 includes a second motor base 15, a second motor rear end cover 13, a second motor stator, a second motor rotor 8 and a transmission rod 9; the first motor stator is fixedly connected with the first motor base 14, the first motor rotor 7 is rotationally connected with the first motor base 14, and the first reducer 5 is disposed in a cavity formed after the first motor base 14 is fixedly connected with the first motor front end cover 16; the second motor stator is fixedly connected with the second motor base 15, the second motor rotor 8 is rotationally connected with the second motor base 15, and the second motor rear end cover 13 is fixedly connected with the second motor base 15; the transmission rod 9 is connected with the second motor rotor 8 as an output shaft of the second motor assembly 2, and the transmission rod 9 is connected with an input gear of the second reducer 6; the second motor base 15 is fixedly connected with the first motor and reducer assembly 1.

A first encoder is mounted between the first motor rotor 7 and the first motor base 14, and a second encoder is mounted between the second motor rotor 8 and the second motor base 15. The first output connecting rod 3 includes a first housing 31 and a second housing 32, and the output shaft of the first motor and reducer assembly is fixedly connected with one side of the first housing 31; the first housing 31 and the second housing 32 are fixedly connected to form an accommodating cavity, and the second reducer 6 is provided in the accommodating cavity; the transmission rod 9 passes through a rotation center of the first motor and reducer assembly 1 and extends into the accommodating cavity to become an input shaft of the second reducer 6.

An output end of the second reducer 6 is provided with a second joint output rocker arm 10, a connecting rod 11 is provided in the accommodating cavity, one end of the connecting rod 11 is rotationally connected with the second joint output rocker arm 10, and the other end is rotationally connected with a second output connecting rod 4; the second joint output rocker arm 10, the connecting rod 11, the first output connecting rod 3 and the second output connecting rod 4 jointly form a connecting rod transmission. The robot dual-joint unit further includes a first motor driver and a second motor driver, the first motor driver is provided on a side part of the first motor base 14, and the second motor driver is provided on a side part of the second motor base 15; a cooling fan is provided on the first motor base 14 and the second motor base 15.

Figure 3:
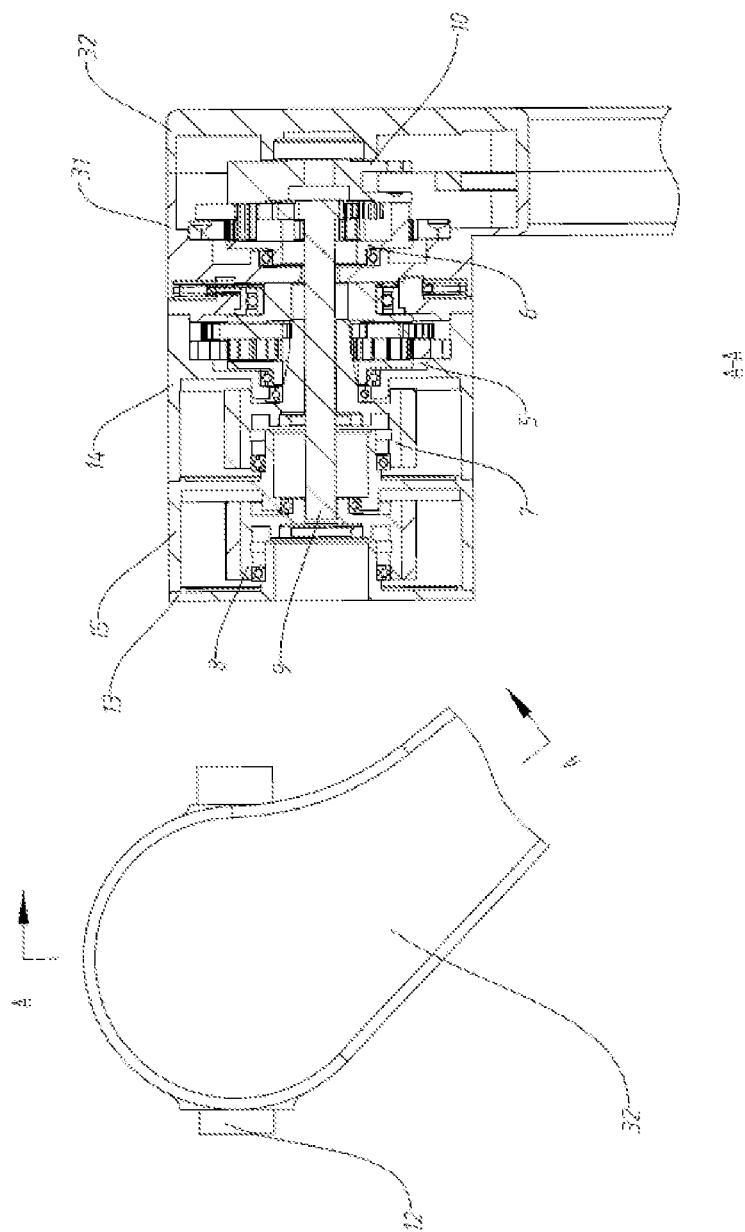
FIG. 3 illustrates a partial sectional view of the present application.

The connection relationship between the component in the highly integrated robot dual-joint unit provided by the present application is as illustrated in FIG. 3. The rotation centers of the first motor rotor 7, the second motor rotor 8, the transmission rod 9 and the second joint output rocker arm 10 are all on the same axis.

Figure 4:
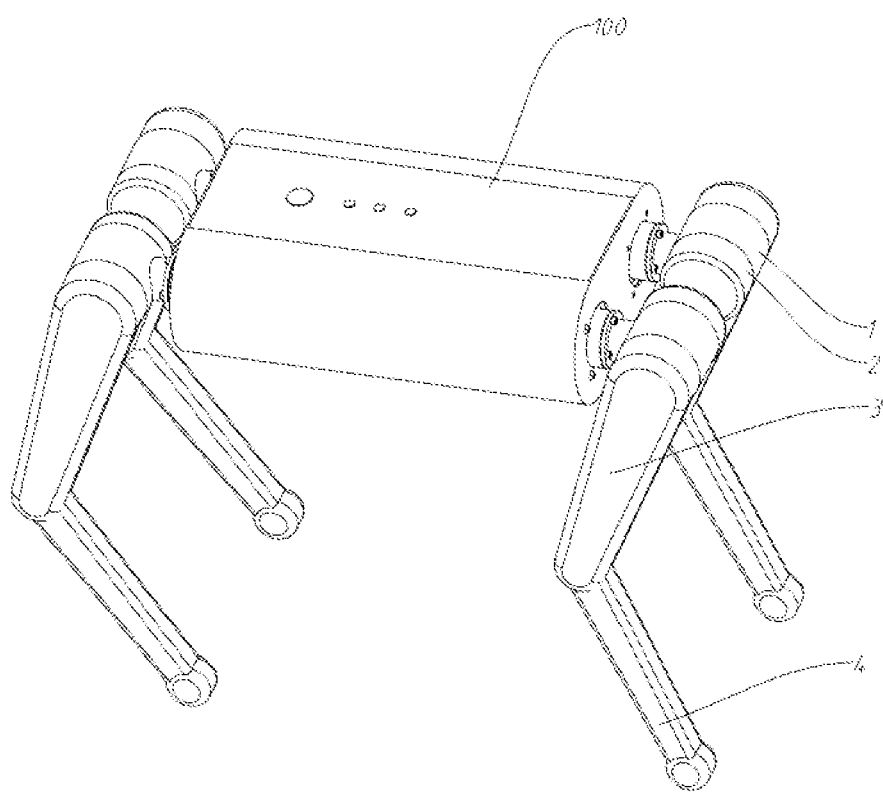
FIG. 4 illustrates a schematic view when the present application is applied to a four-legged robot.

Referring to FIG. 4, the legged robot provided by the present application includes a body 100, a first output connecting rod rotationally connected with the body 100 and a second output connecting rod 4 rotationally connected with the first output connecting rod 3; a first motor and reducer assembly 1 and a second motor assembly 2 are sequentially and axially provided inwards on a side part of the first output connecting rod 3; the first motor and reducer assembly 1 is used to drive the first output connecting rod 3 to rotate relative to the body 100 along the axis of the first motor and reducer assembly 1, and the second motor assembly 2 is used to drive the second output connecting rod 4 to rotate relative to the first output connecting rod 3; the first motor and reducer assembly 1 and the second motor assembly 2 are provided on the side of the first output connecting rod 3 towards the inside of the body 100.

The first motor and reducer assembly 1 includes a first motor and a first reducer 5 which are provided axially, and the first motor drives the first output connecting rod 3 to rotate relative to the body 100 along the axis of the first motor and reducer assembly 1 through the first reducer 5; the second motor assembly 2 includes a second motor and a second reducer 6 which are provided axially, and the second motor drives the second output connecting rod 4 to rotate relative to the first output connecting rod 3 through the second reducer 6.

The first reducer 5 may be a planetary gear reducer, the output end of the first reducer 5 is fixedly connected with the first housing 31, and the input end of the first reducer 5 is placed in a cavity formed by the first motor base 14 and the first motor front end cover 16. The first housing 31 and the second housing 32 form an accommodating cavity, and the second reducer 6 is provided in the a accommodating cavity, that is, the second reducer 6 is provided in the first output connecting rod 3; the second motor includes a second motor rotor 8, a transmission rod 9 is fixedly provided at the rotation center of the second motor rotor 8, the transmission rod 9 passes through the rotation center of the first motor and reducer assembly 1, extends into the accommodating cavity and is connected with the input end of the second reducer 6, the second motor transmits power to the second reducer 6 through the transmission rod 9, the transmission rod 9 is directly driven by the second motor, and the rotation of the transmission rod 9 is not influenced by the first motor and reducer assembly 1.

The output end of the second reducer 6 is connected with a second joint output rocker arm 10, and a connecting rod 11 is provided in the accommodating cavity; one end of the connecting rod 11 is rotationally connected with the second joint output rocker arm 10, and the other end is rotationally connected with the second output connecting rod 4, that is, the second motor assembly 2 drives the second output connecting rod 4 to rotate relative to the first output connecting rod 3 through the connecting rod 11; a first rotation center 41 is the rotation center that the second output connecting rod 4 rotates relatively around the first output connecting rod, a second rotation center 42 is the rotation center that the connecting rod 11 and the second output connecting rod 4 rotate relatively; the second joint output rocker arm 10, the connecting rod 11, the first output connecting rod 3 and the second output connecting rod 4 form a contra-parallelogram four-rod drive mechanism.

The second motor includes a second motor base 15 and a second motor rear end cover 13. A second motor stator is provided on the inner side of the second motor base 15, and the first motor includes a first motor rotor 7 and a first motor base 14; the second motor rear end cover 13 and the second motor base 15 form a first placement cavity, and the second motor rotor 8 is provided in the first placement cavity; the second motor base 15 and the first motor base 14 form a second placement cavity, the first motor rotor 7 is provided in the second placement cavity, and the first motor rotor 7 is rotationally connected with the first motor base 14 through a bearing; the first motor base 14 and the first housing 31 form a third placement cavity, and the first reducer 5 is provided in the third placement cavity through a bearing. The outer side of the first motor base 14 is provided with a rotating seat 12, and the first motor base 14 is rotationally connected with the body 100 through the rotating seat 12. An encoder is mounted between the first motor rotor 7 and the first motor base 14, and an encoder is also mounted between the second motor rotor 8 and the second motor base 15. A cooling fan is fixedly provided on the first motor base 14 and the second motor base 15 to dissipate the heat produced by the first motor and the second motor. A first encoder is mounted between the first motor rotor 7 and the first motor base 14, and a second encoder is mounted between the second motor rotor 8 and the second motor base 15. The robot dual-joint unit further includes a first motor driver and a second motor driver, the first motor driver is provided on a side part of the first motor base 14, and the second motor driver is provided on a side part of the second motor base 15.

The robot dual-joint unit is rotationally connected with the body 100 through the rotating seat 12, the first motor and reducer assembly 1 and the second motor assembly 2 on the leg are provided on the inner side of the first output connecting rod 3 towards the body, thus the outer side of the first output connecting rod 3 has no very protruding part relative to the body 10, it will not interfere with the external environment during the operation of the robot, and this part will not be damaged due to the impact with the ground when the robot falls.

Figure 5:
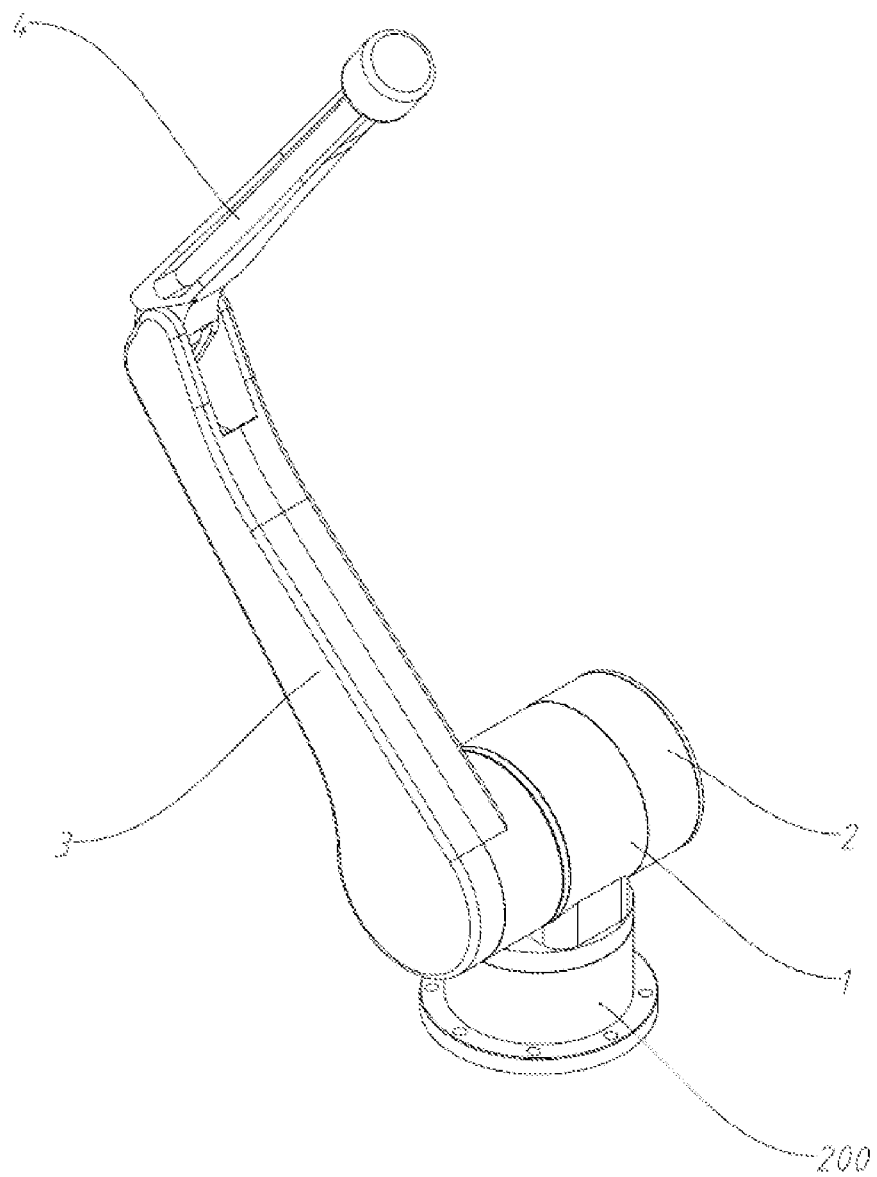
FIG. 5 illustrates a schematic view when the present application is applied to a cooperative manipulator.

Referring to FIG. 5, the cooperative manipulator provided by the present application includes the highly integrated robot dual-joint unit which is fixedly connected with a rotation output shaft of a base 200 through a rotating seat 12.

What are described above are just preferred implementation modes of the present application, which should not limit the scope of protection of the present application accordingly. Any non-substantive changes and replacements made by those skilled in the art on the basis of the present application shall fall within the scope of protection of the present application.

The invention claimed is:

1. A highly integrated robot dual-joint unit, comprising a first joint consisting of a first motor and reducer assembly; and
a second joint consisting of a second motor assembly and a second reducer,
wherein a fixed end of the second motor assembly is fixedly connected with a fixed end of the first motor and reducer assembly, and an output end of the second motor assembly passes through the first motor and reducer assembly and is configured to drive the second reducer,
wherein the first motor and reducer assembly comprises a first motor base, a first motor stator, a first motor rotor, a first reducer and a first motor front end cover,
wherein the second motor assembly comprises a second motor base, a second motor rear end cover, a second motor stator, a second motor rotor and a transmission rod,
wherein the first motor stator is fixedly connected with the first motor base, the first motor rotor is rotationally connected with the first motor base, and the first reducer is disposed in a cavity,
wherein the second motor stator is fixedly connected with the second motor base, the second motor rotor is rotationally connected with the second motor base, and the second motor rear end cover is fixedly connected with the second motor base,
wherein the transmission rod is connected with the second motor rotor as an output shaft of the second motor assembly, and the transmission rod is connected with an input gear of the second reducer,
wherein the second motor base is fixedly connected with the first motor and reducer assembly,
wherein a first output connecting rod is fixedly provided on an output shaft of the first motor and reducer assembly, the first output connecting rod comprises a first housing and a second housing, and the output shaft of the first motor and reducer assembly is fixedly connected with one side of the first housing,
wherein the first housing and the second housing are fixedly connected to form an accommodating cavity, and the second reducer is provided in the accommodating cavity,
wherein the transmission rod passes through a rotation center of the first motor and reducer assembly and extends into the accommodating cavity to become an input shaft of the second reducer.

2. The highly integrated robot dual-joint unit according to claim 1, wherein the fixed ends of the first motor and reducer assembly and the second motor assembly are connected.

3. The highly integrated robot dual-joint unit according to claim 1, wherein a first output connecting rod is fixedly provided on an output shaft of the first motor and reducer assembly, the second reducer is provided in the first output connecting rod, and the second motor assembly is configured to drive the second reducer through a transmission rod.

4. The highly integrated robot dual-joint unit according to claim 1, wherein a first encoder is mounted between the first motor rotor and the first motor base, and a second encoder is mounted between the second motor rotor and the second motor base.

5. The highly integrated robot dual-joint unit according to claim 1, wherein an output end of the second reducer is provided with a second joint output rocker arm, a connecting rod is provided in the accommodating cavity, one end of the connecting rod is rotationally connected with the second joint output rocker arm, and the other end is rotationally connected with a second output connecting rod; the second joint output rocker arm, the connecting rod, the first output connecting rod and the second output connecting rod jointly form a connecting rod transmission.

6. The highly integrated robot dual-joint unit according to claim 5, wherein the robot dual-joint unit further comprises a first motor driver and a second motor driver, the first motor driver is provided on a side part of the first motor base, and the second motor driver is provided on a side part of the second motor base; a cooling fan is provided on the first motor base and the second motor base.

7. A legged robot, wherein the legged robot comprises the robot dual-joint unit according to claim 1 and a body, and the first motor and reducer assembly is rotationally connected with the body.

8. A cooperative manipulator, wherein the cooperative manipulator comprises the robot dual-joint unit according to claim 1 and a base, and the first motor and reducer assembly is rotationally connected with the base.

* * * * *